(12) United States Patent  
Sugiyama et al.

(10) Patent No.: US 8,350,427 B2  
(45) Date of Patent: Jan. 8, 2013

(54) STATOR OF ROTARY ELECTRICAL MACHINE

(75) Inventors: Toshiya Sugiyama, Okazaki (JP); Jun Abiko, Kariya (JP); Yasutoshi Yamada, Chita-gun (JP); Hiroyuki Nagata, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 369 days.

(21) Appl. No.: 12/717,179

(22) Filed: Mar. 4, 2010

(65) Prior Publication Data

US 2010/0244597 A1   Sep. 30, 2010

(30) Foreign Application Priority Data

Mar. 27, 2009   (JP) ................................. 2009-080461

(51) Int. Cl.
  *H02K 1/04*   (2006.01)
  *H02K 11/00*   (2006.01)
(52) U.S. Cl. .............. 310/71; 310/43; 310/45; 310/184; 310/194; 310/198; 310/208
(58) Field of Classification Search .................... 310/43, 310/45, 71, 194, 208, 184, 198; *H02K 11/00, H02K 1/04*
See application file for complete search history.

(56) References Cited

U.S. PATENT DOCUMENTS

| 7,034,419 | B2* | 4/2006 | Kabasawa et al. | 310/71 |
| 7,476,995 | B2* | 1/2009 | Uchiyama et al. | 310/71 |
| 2003/0173842 | A1* | 9/2003 | Kobayashi et al. | 310/71 |
| 2006/0033395 | A1* | 2/2006 | Izumi et al. | 310/208 |
| 2006/0043806 | A1* | 3/2006 | Torii et al. | 310/71 |
| 2007/0080592 | A1* | 4/2007 | Ohta et al. | 310/71 |
| 2007/0262664 | A1* | 11/2007 | Niehaus et al. | 310/71 |
| 2008/0122301 | A1* | 5/2008 | Okada et al. | 310/43 |
| 2009/0039720 | A1* | 2/2009 | Tsukashima et al. | 310/71 |
| 2009/0140595 | A1* | 6/2009 | Naganawa et al. | 310/201 |
| 2010/0244597 | A1* | 9/2010 | Sugiyama et al. | 310/71 |

FOREIGN PATENT DOCUMENTS

JP           4073705 B     4/2008

* cited by examiner

*Primary Examiner* — John K Kim  
(74) *Attorney, Agent, or Firm* — Buchanan Ingersoll & Rooney PC

(57) ABSTRACT

A stator of a rotary electrical machine includes a core unit configured by a plurality of core assemblies, around which wires are respectively wound to form the coils, including low voltage side terminals, which connect first ends of the coils, and a bus ring attached to the core unit so as to connect second ends of the coils to electricity supply wires by high voltage side terminals. Each terminal accommodating portion is individually formed relative to each of the core assemblies at an external side of the coils. Each of the terminal accommodating portions is filled with an insulating resin material in a state where at least one of a connecting portion of the first end and each of the low voltage side terminals and a connecting portion of the second end and each of the high voltage side terminals is accommodated within each of the terminal accommodating portions.

8 Claims, 11 Drawing Sheets

F I G. 11
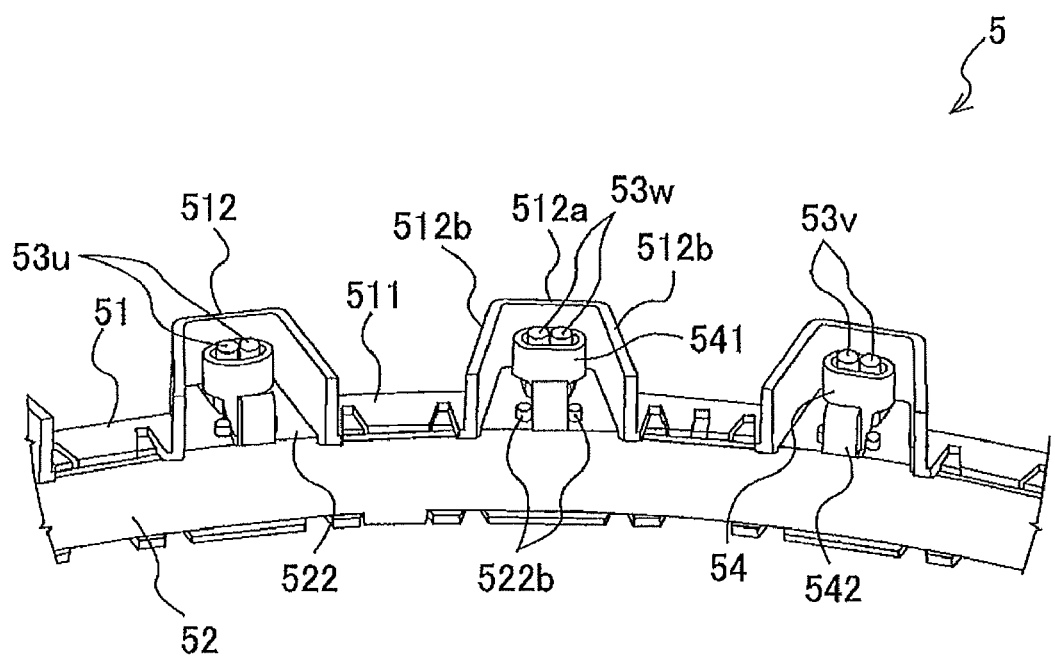

STATOR OF ROTARY ELECTRICAL MACHINE

CROSS REFERENCE TO RELATED APPLICATIONS

This application is based on and claims priority under 35 U.S.C. §119 to Japanese Patent Application 2009-080461, filed on Mar. 27, 2009, the entire content of which is incorporated herein by reference.

TECHNICAL FIELD

This disclosure relates to a stator of a rotary electrical machine for driving a rotor facing the stator in a radial direction.

BACKGROUND DISCUSSION

According to a known stator of a rotary electrical machine, disclosed in, for example, JP4073705B, the stator is formed in a manner where a plurality of split cores, around each of which a coil is wound, is held to form a ring shape. End portions of the coil are respectively attached to a low voltage side terminal and a high voltage side terminal, which are respectively attached to insulators, having laminated steel plates.

The insulator is formed with groove portions, each of which is configured by a pair of vertical walls, at an inner end portion and an outer end portion of the insulator, respectively, in a radial direction of the stator. The groove portions, formed at the insulators of the adjacent split cores, are connected to each other, and thereby being formed so as to extend along an entire circumference at an inner end portion and an outer end portion of the stator in the radial direction thereof. The high voltage side terminal and the low voltage side terminal, each of which is connected to the end portions of the coil, are attached to the corresponding grooves of the insulator, and in such a state, the grooves are filled with an insulating resin material. Accordingly, low voltage side end portions of the coils of the split cores are integrated, and electricity may be applied to high voltage side end portions of the coils of the split cores in order to drive a rotor, which is provided at a radially inner side of the stator.

According to the stator disclosed in JP4073705B, the resin material is injected into the grooves, which are respectively formed at the inner end portion and the outer end portion of the stator in the radial direction thereof so as to extend along the entire circumference. Therefore, an amount of the insulating resin material, used for the filling, may increase, and a cost required for manufacturing the stator may increase. Further, the increase of the amount of the resin material may result in a restriction on a filling device and on a filling manner, such as a filling speed and a filling pressure. Accordingly, the cost may further increase.

Furthermore, it may be difficult to fill a detailed portion with the resin material because a portion to be filled with the resin material extends for a wide range. Accordingly, a portion where a filling of the resin material is deteriorated may be generated. In a case where the deterioration of the filling of the resin material occurs, the end portions of the coil may not be insulated sufficiently, and as a result the rotary electrical machine may not be operated appropriately.

A need thus exists for a stator of a rotary electrical machine, which is not susceptible to the drawback mentioned above.

SUMMARY

According to an aspect of this disclosure, a stator of a rotary electrical machine for generating a rotating magnetic field when coils are energized through electricity supply wires, the stator of the rotary electrical machine includes a core unit configured by a plurality of core assemblies, around which wires are respectively wound to form the coils and which are arranged to form a ring shape, including low voltage side terminals, which connect first ends of the coils, and includes a bus ring formed into a ring shape so as to face the core unit, holding the electricity supply wires, and attached to the core unit so as to connect second ends of the coils to the electricity supply wires by means of high voltage side terminals. The plurality of core assemblies is engaged with the bus ring, and each terminal accommodating portion, which is formed into a container shape having a predetermined volume, is individually formed relative to each of the plurality of core assemblies at an external side of the coils in a state where the bus ring is attached to the core unit. Each of the terminal accommodating portions is filled with an insulating resin material in a state where at least one of a connecting portion of the first end of each of the coils and each of the low voltage side terminals and a connecting portion of the second end of each of the coils and each of the high voltage side terminals is accommodated within each of the terminal accommodating portions.

BRIEF DESCRIPTION OF THE DRAWINGS

The foregoing and additional features and characteristics of this disclosure will become more apparent from the following detailed description considered with the reference to the accompanying drawings, wherein:

FIG. 11 is a partially enlarged perspective view illustrating the bus ring shown in FIG. 10 when seen from a radially inner direction;

DETAILED DESCRIPTION

Figure 7:
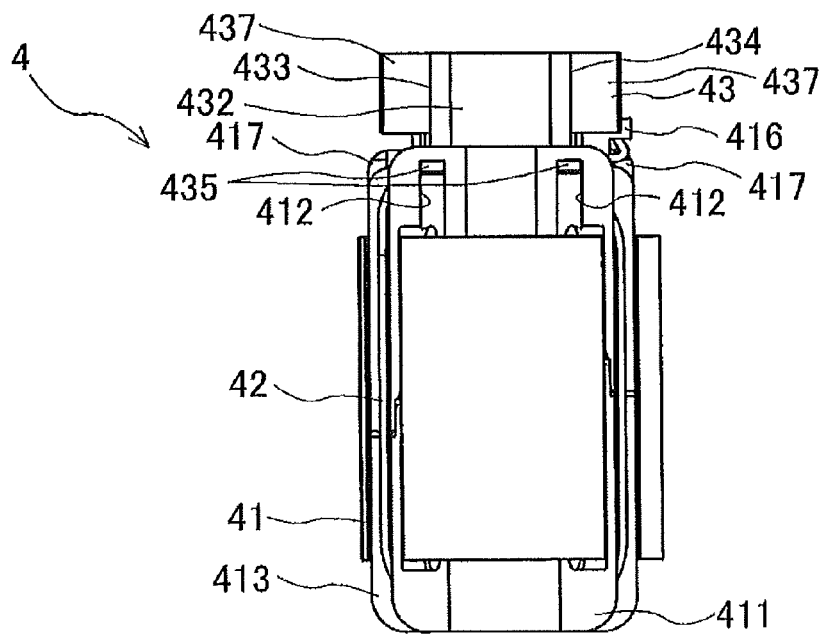
FIG. 7 is a front view illustrating the split core when seen from a radially inner direction.
Figure 8:
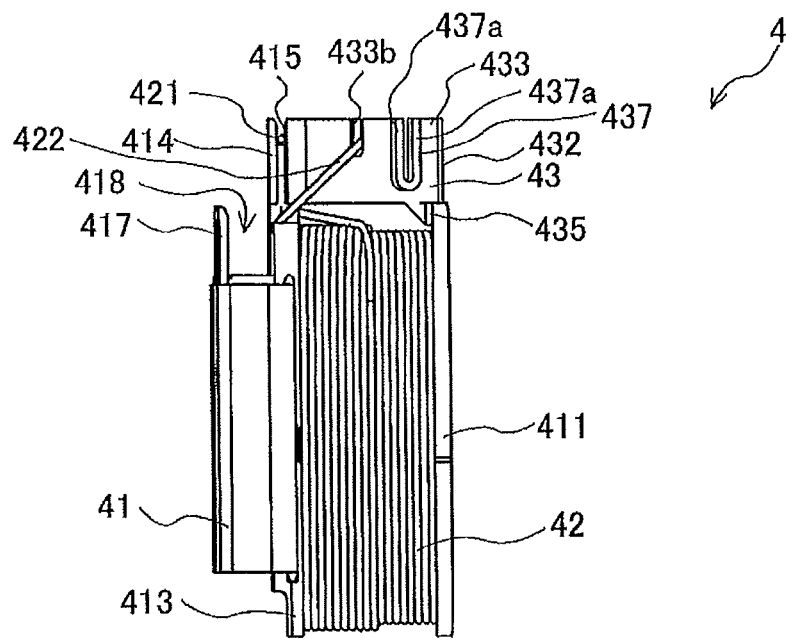
FIG. 8 is a side view illustrating the split core when seen in a circumferential direction.
Figure 9:
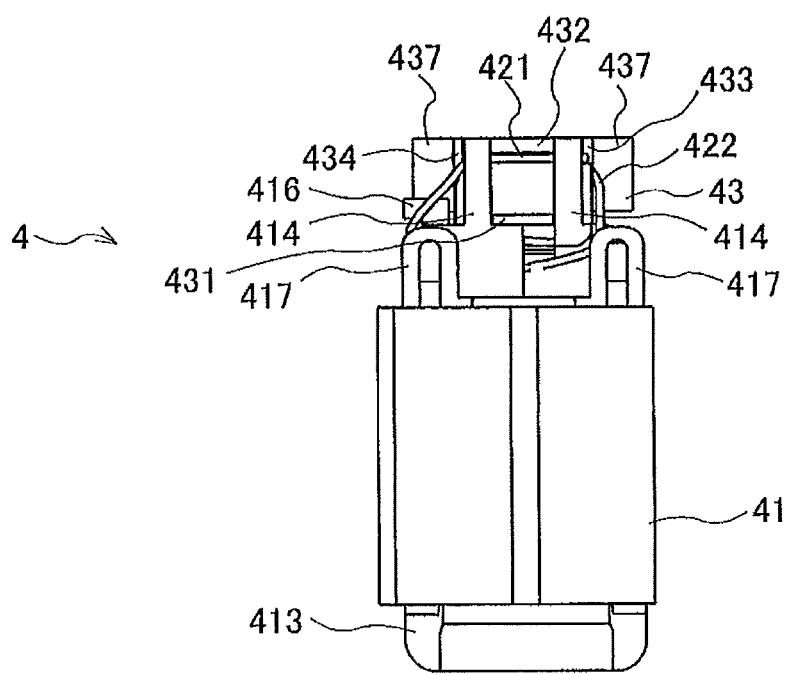
FIG. 9 is a front view illustrating the split core when seen from a radially outer direction.

An embodiment of a stator of a rotary electrical machine (which will be referred to as a stator 1 hereinafter) will be described hereinafter with reference to FIGS. 1 to 16. In the description, an upper-lower direction of a split core 4 corresponds to an upper-lower direction in FIG. 7. However, such direction does not necessarily correspond to an actual orientation of the stator 1. An upper-lower direction of a resin box 43 corresponds to an upper-lower direction in FIG. 5. However, such direction does not necessarily correspond to the actual orientation of the stator 1. A rear direction of the resin box 43 corresponds to a left direction in FIG. 5 (a radially inner direction of the stator 1) while a front direction of the resin box 43 corresponds to a right direction in FIG. 5 (a radially outer direction of the stator 1). However, such direction does not necessarily correspond to the orientation of the stator 1. An upper-lower direction of a bus ring 5 corresponds to an upper-lower direction in FIG. 11. However, such direction does not necessarily correspond to the actual orientation of the stator 1.

Figure 1:
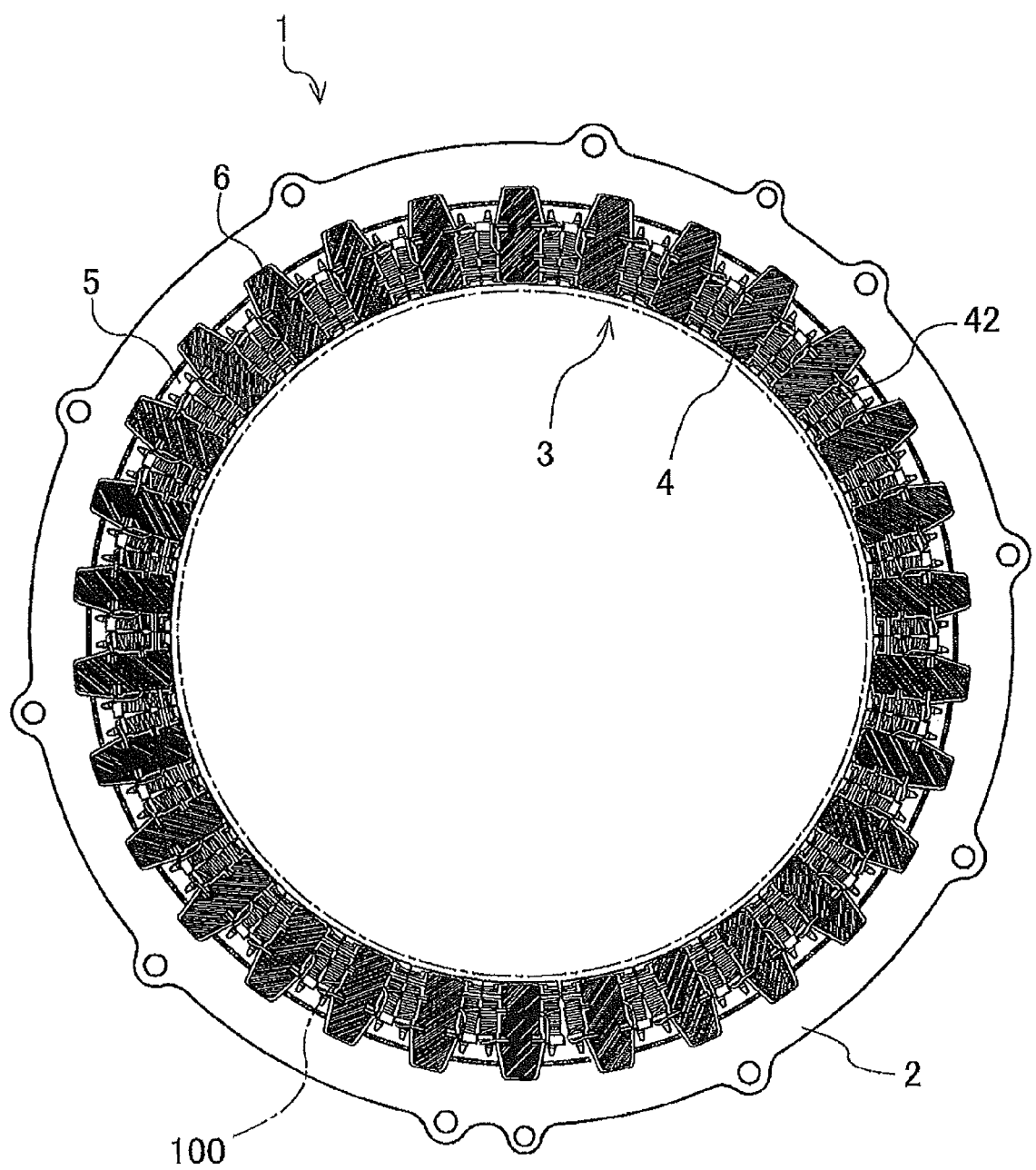
FIG. 1 is a planar view illustrating a stator of a rotary electrical machine according to an embodiment.

FIG. 1 is a planar view illustrating the stator 1. A plurality of split cores (thirty split cores according to the embodiment) (core assemblies) 4 is evenly held by a stator housing 2 at an inner circumferential surface thereof. The split cores 4, around each of which an enamel wire is wound so as to form a coil 42, are arranged next to each other at an inner side of the stator housing 2 so as to form a substantially ring shape, thereby configuring a core unit 3. The core unit 3 together with the bus ring 5 configures a plurality of accommodating portions (terminal accommodating portions) 6. Each of the accommodating portions 6 is filled with an insulating resin material.

A rotor 100, which faces an inner circumferential surface of the core unit 3, is shown in FIG. 1 by a dashed line. However, the rotor 100 is not included in components of the stator 1. When the split cores 4 are energized, a rotating magnetic field is generated relative to the core unit 3, and the rotor 100 is rotated relative to the stator 1.

Figure 2:
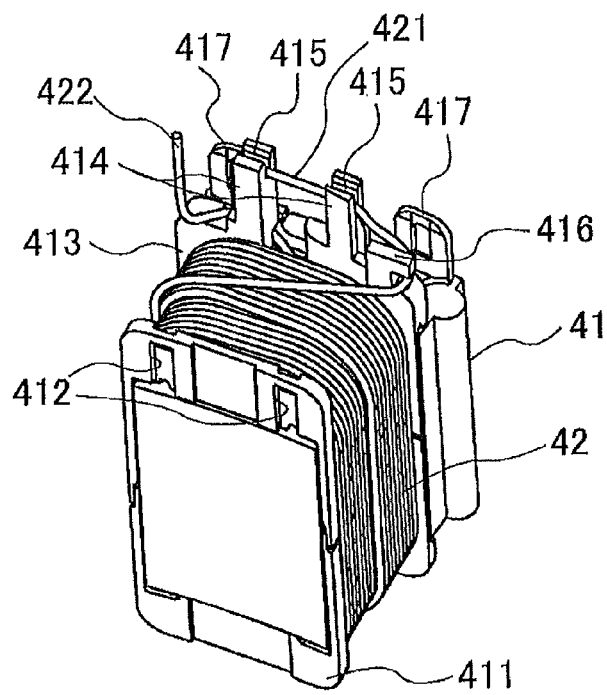
FIG. 2 is a perspective view illustrating a split core in a state where a resin box is removed.

FIG. 2 illustrates a state where the resin box 43 is removed from the split core 4. The split core 4 includes a core holder 41, having laminated steel plates at an inside thereof. The core holder 41, made of a synthetic resin material, insulates the laminated steel plates, provided at the inside thereof. A first flange (a protruding portion) 411, which protrudes in the upper-lower direction and in a circumferential direction of the split cores 4, is formed at an end portion of the core holder 41 so that in a state where the split cores 4 are held by the stator housing 2, the first flange portion 411 is located at a radially inner end portion of the core holders 41.

A pair of engagement holes 412 is formed at an upper portion of the first flange 411. The pair of engagement holes 412 extends through the first flange 411. The pair of engagement holes 412 is spaced away from each other by a predetermined distance in a circumferential direction of the split cores 4 in a state where the split cores 4 are held by the stator housing 2 (which will be referred to as a circumferential direction hereinafter).

A second flange 413, which protrudes in the upper-lower direction and in the circumferential direction of the split cores 4, is formed at the core holder 41 so that in a state where the split cores 4 are held by the stator housing 2, the second flange portion 413 faces the first flange portion 411 from a radially outer direction of the split cores 4. A pair of wire engagement portions (a protruding portion, a peripheral wall) 414 is formed at an upper end portion of the second flange 413 so as to extend in an upper direction of the split core 4. The pair of wire engagement portions 414 is positioned so as to be spaced away from each other in the circumferential direction. Holding slits (slits) 415 are respectively formed at upper end portions of the pair of wire engagement portions 414 so as to extend in the circumferential direction. Further, a hook portion 416 is formed at an upper end of the second flange 416 so as to be positioned adjacent to one of the wire engagement portions 414. The hook portion 416 is formed into a substantially L shape, which opens outwardly in a circumferential direction of the split cores 4.

A pair of retainers (holding portions) 417, which protrudes in the upper direction of the split core 4 (corresponding to an axial direction of the core unit 3), are formed at the core holder 41 so that in a state where the split cores 4 are held by the stator housing 2, the retainers 417 are located at a radially outer end surface of the core holder 41. The pair of retainers 417 is spaced away from each other by a predetermined distance in the circumferential direction. The pair of retainers 417 faces the resin box 43 (described later) in a radial direction of the stator 1 (which will be referred to as a radial direction). A bus ring insertion portion 418 is formed between the retainers 417 and the second flange 413 in the radial direction (see FIG. 8).

The coil 42 is formed by an enamel wire and the like, which is wound around the stator 41 at a portion between the first flange 411 and the second flange 413. A high voltage side end portion (a second end) 421 of the wound coil 42 is engaged with the hook portion 416 before being bent in the opposite direction so as to be inserted into the holding slits 415 of the wire engagement portions 414, thereby extending between the pair of the wire engagement portions 414 (see FIG. 2).

Figure 3:
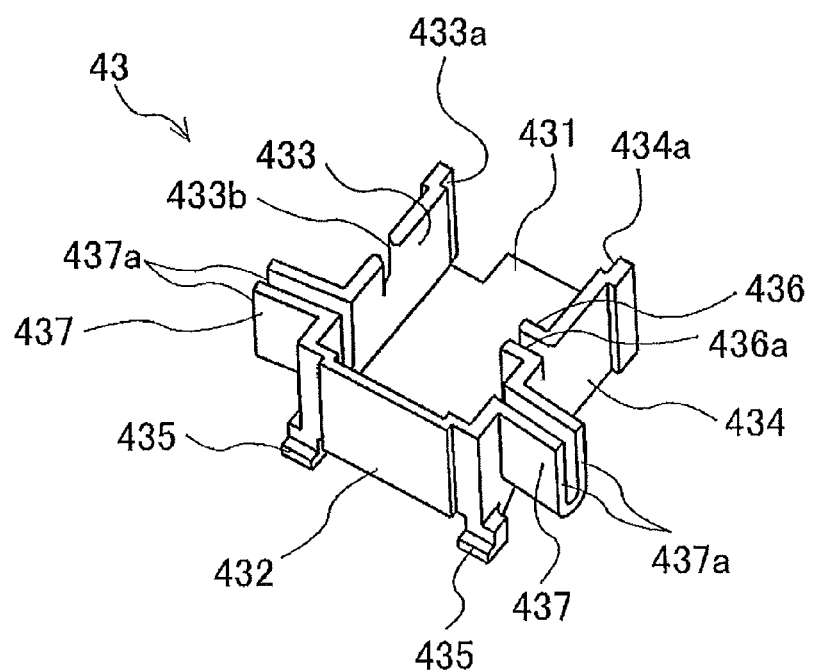
FIG. 3 is a perspective view illustrating a resin box.
Figure 4:
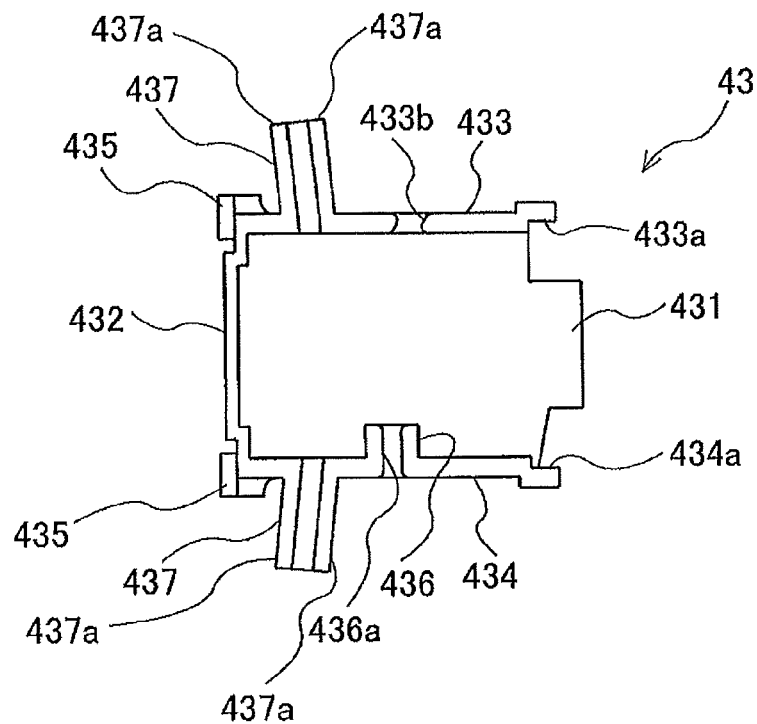
FIG. 4 is a planar view illustrating the resin box.
Figure 5:
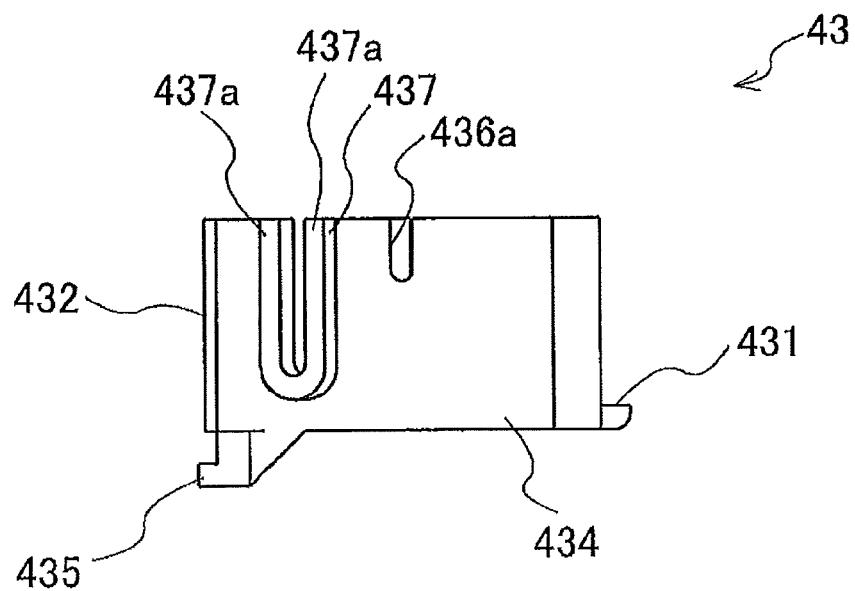
FIG. 5 is a side view illustrating the resin box.
Figure 6:
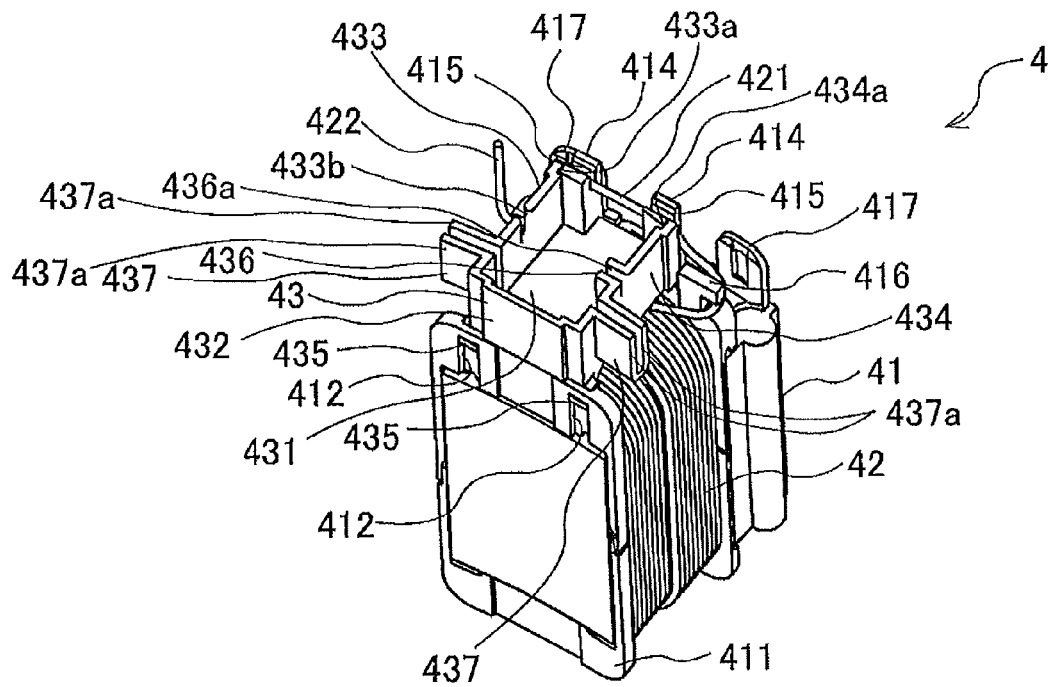
FIG. 6 is a perspective view illustrating the split core.

As illustrated in FIGS. 3 to 5, the resin box (a box portion) 43, made of, for example, aromatic nylon, polyphenylene sulfide resin or the like, is formed so as to be formed into a substantially container shape. The resin box 43 includes a rear wall 432 (a peripheral wall) at an end of a bottom plate portion 431 in a rear direction of the resin box 43 and a pair of side plates 433 and 434 (a first side plate 433 and a second side plate 434) (peripheral walls) at side ends of the bottom plate portion 431. An upper side and a front side of the resin box 43 (sides at which the bus ring 5 (describer later) is positioned in the stator 1) are open, and thereby being formed into a substantially U shape when seen in a planner shape. The resin box 43 is provided at an upper portion of the core holder 41 so as to be attachable thereto and detachable therefrom. A first stepped portion 433a and a second stepped portion 434a are respectively formed at front end portions of the first and second side plates 433 and 434 so as to elongate widths of the first and second side plates 433 and 434. Holder engagement portions 435 are respectively formed at rear ends of the first and second side plates 433 and 434 so as to protrude in the lower direction.

A holding groove 433b (a slit), which is open in the upper direction of the resin box 43, is formed at the first side plate 433. A portion of the second side plate 434 is cut out and a boss portion 436, which includes a substantially U-shaped cross section and protrudes toward the first side plate 433 facing the second side plate 434, is formed at the cut-out portion of the second side plate 434. A wire slit 436a (a slit), whose upper end is open, is formed at an inner side of the boss portion 436.

Terminal attachment portions 437 are formed at the resin box 43 so as to extend from rear end portions of the first and second side plates 433 and 434, respectively, outwardly in the circumferential direction. Each of the terminal attachment portions 437 is configured by a pair of holding walls 437a, which extends in parallel with each other and which are connected to each other at lower ends thereof, thereby being formed to include a substantially U-shaped cross section. A clearance is generated between the pair of holding walls 437a, which faces each other, so as to extend through each of the first and second side plates 433 and 434, so that a neutral point terminal 44 (described later) may be inserted therein.

As illustrated in FIGS. 6 to 9, the resin box 43 is attached to the upper portion of the core holder 41, around which the wire of the coil 42 is wound, and thereby completing the assembling of the split core 4. Rear end portions of the holder engagement portions 435 of the resin box 43 are inserted into the corresponding engagement holes 412 of the core holder 41 so that the resin box 43 is attached to the core holder 41. Further, the first and second stepped portions 433a and 434a of the first and second side plates 433 and 434 are engaged to the corresponding wire engagement portions 414 from the outer circumferential direction. Thus, the resin box 43 is positioned relative to the core holder 41 in a planar surface.

A low voltage side end portion (a first end) 422 of the coil 42 is inserted into the holding groove 433b of the first side plate 433, and then engaged with the wire slit 436a of the second side plate 434. The low voltage side end portion thereby extends between the first and second walls 433 and 434 (see FIGS. 15 and 16).

Figure 16:
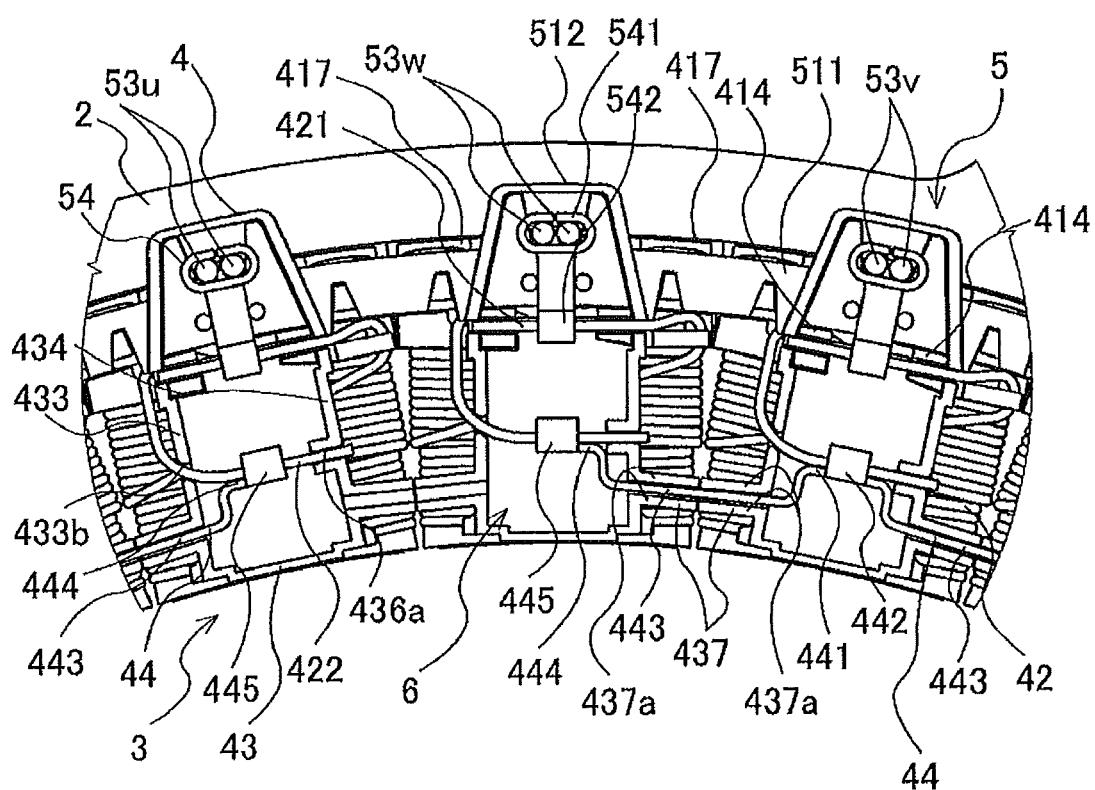
FIG. 16 is a partial planar view of FIG. 15.

All of the split cores 4 are attached to the inner circumferential surface of the stator housing 2 so as to form a substantially ring shape, and then neutral point terminals (low voltage side terminals) 44 are respectively attached to the resin boxes 43 (see FIG. 16). The neutral point terminal 44 is made of a metal, having electric conductivity. When seen in a planar view, the neutral point terminal 44 is formed into a substantially longitudinally-symmetrical shape about an intermediate protruding portion 441, which is formed at an intermediate portion of the neutral point terminal 44 in a longitudinal direction thereof. The intermediate protruding portion 441 is formed so as to protrude in the radially outer direction in a state of being attached to the resin box 43, and an intermediate connecting piece 442 is formed at the intermediate protruding portion 441. Further, both ends of the intermediate protruding portion 441 are respectively formed with insertion portions 443, which forms a substantially straight line. Furthermore, the insertion portions 443 are respectively formed with end portions 444, which are formed so as to protrude in the radially outer direction. The end portions 444 are respectively formed with end portion connecting pieces 445.

The insertion portions 443 of the neutral point terminal 44 are inserted into the holding walls 437a of the resin boxes 43, which are adjacent to each other, and thereby being attached to three adjacent resin boxes 43. Consequently, the intermediate connecting piece 442 and the end portion connecting pieces 445 are arranged within the resin boxes 43 of three of the adjacent split cores 4. The intermediate connecting piece 442 and the end portion connecting pieces 445 are fixed to the corresponding low voltage side end portions 422 of the coils 42, each of which extends between the first and second side plates 433 and 434, by means of fusing, swaging, welding, and the like, thereby connecting the low voltage side end portions 422 of the coils 42 relative to each other. All of the neutral point terminals 44 are connected to a low voltage side of an inverter.

Figure 10:
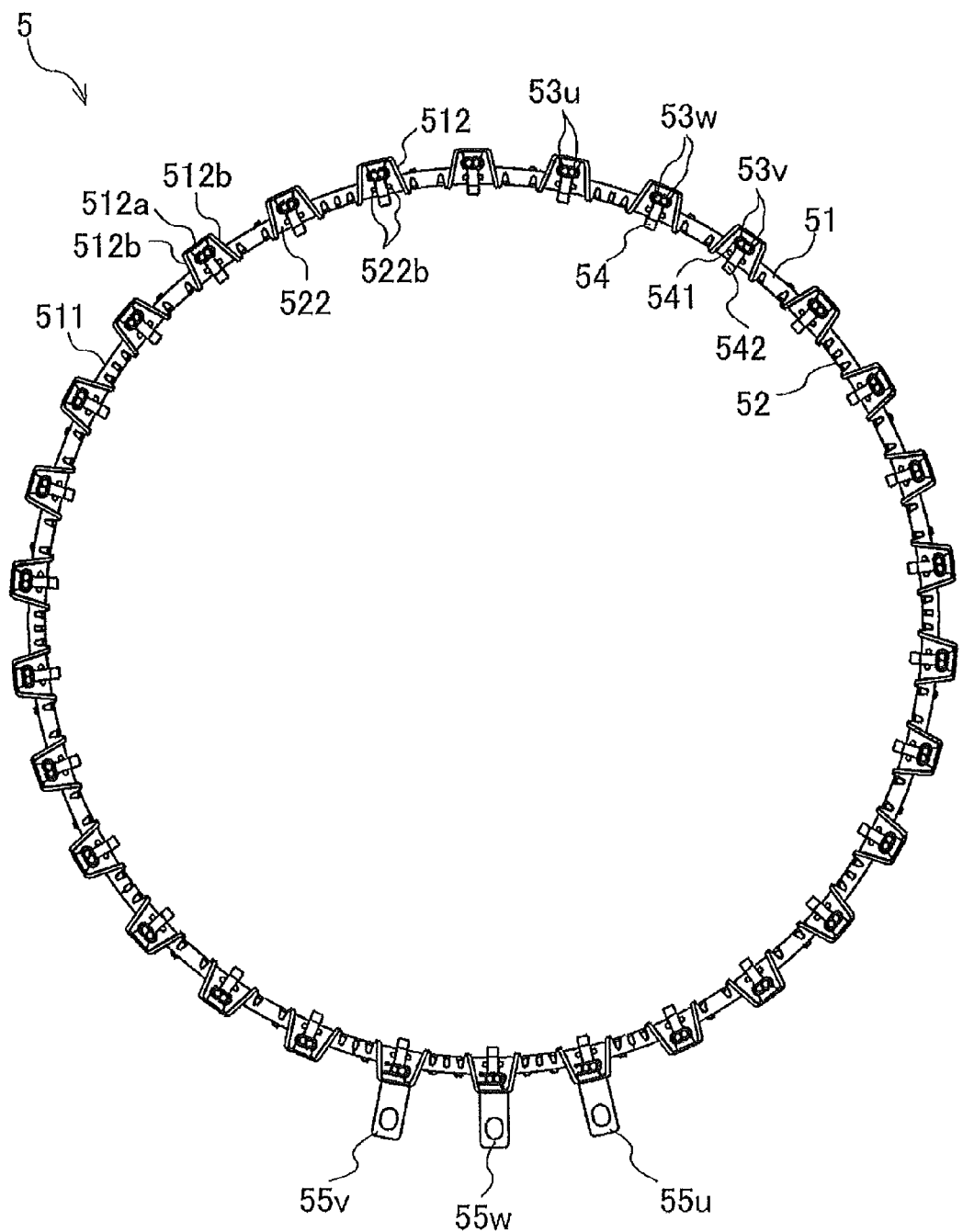
FIG. 10 is a planar view illustrating a bus ring.

As illustrated in FIG. 10, the bus ring 5 is formed into a substantially ring shape so that the bus ring 5 is positioned at an outer portion of the core unit 3 in the radial direction of the stator 1. The bus ring 5 includes an outer clip 51 and an inner clip 52. The outer and inner clips 51 and 52, made of synthetic resin material, are respectively formed into a substantially ring shape, and engaged with each other in the radial direction. Each of the outer and inner clips 51 and 52 may be configured by a plurality of separate segments, which is connected to each other.

First, second and third external terminals 55u, 55v and 55w extend from three portions of the outer clip 51 so as to be connected to corresponding phases of a high voltage side of the inverter. Further, the first, second and third external terminals 55u, 55v and 55w are connected to electricity supply terminals 54 (described later) of corresponding phases in the bus ring 5. Alternatively, the first, second and third external terminals 55u, 55v and 55w and the corresponding electricity supply terminals 54 may be integrally formed.

The bus ring 5 further includes a plurality of first wire segments 53u (a electricity supply wire), a plurality of second wire segments 53v (a electricity supply wire) and a plurality of third wire segments 53w (a electricity supply wire) for each phases. Each of the first, second and third wire segments 53u, 53v and 53w, made of an enamel wire, for example, is formed into a substantially arc shape. The bus ring 5, made of a metal having an electric conductivity, further includes the electricity supply terminals (a high voltage side terminal) 54, which are respectively swaged to the first, second and third wire segments 53u, 53v and 53w.

Figure 12:
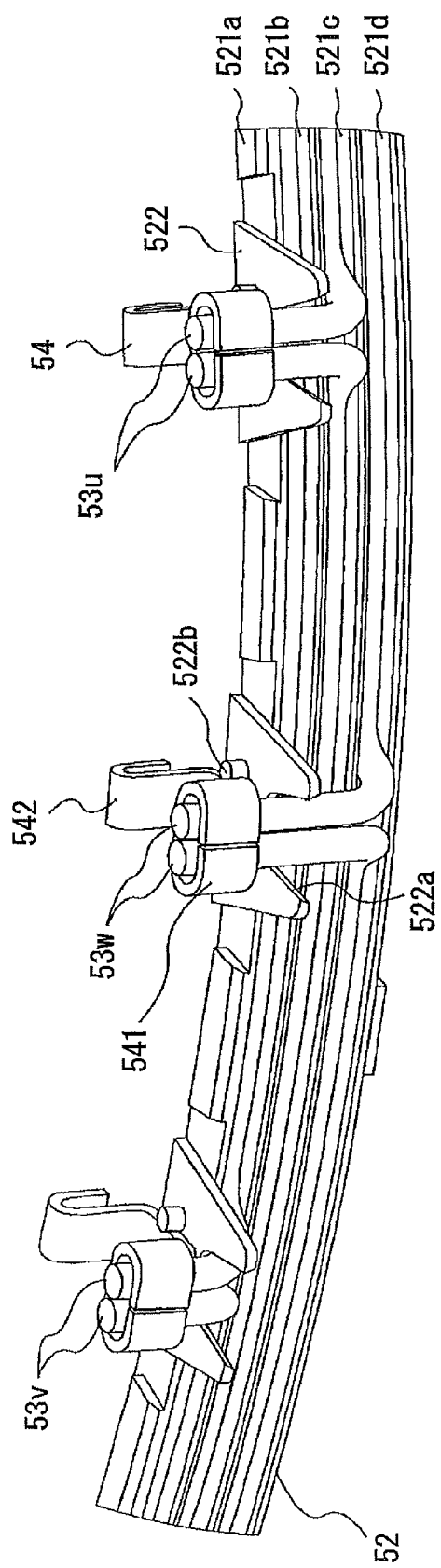
FIG. 12 is a partial perspective view illustrating an inner portion of the bus ring when seen from a radially outer direction.

As illustrated in FIG. 12, a pair of ribs 521b and 521c (a first rib 521b and a second rib 521c), having a substantially ring shape, is formed at an inner circumferential surface of the inner clip 52. The first and second ribs 521b and 521c together with a first upper surface 521a and a second bottom surface 521d of the inner clip 52 hold and insulate the first, second and third wire segments 53u, 53v and 53w so that the first, second and third wire segments 53u, 53v and 53w of different phases do not contact each other.

Figure 13:
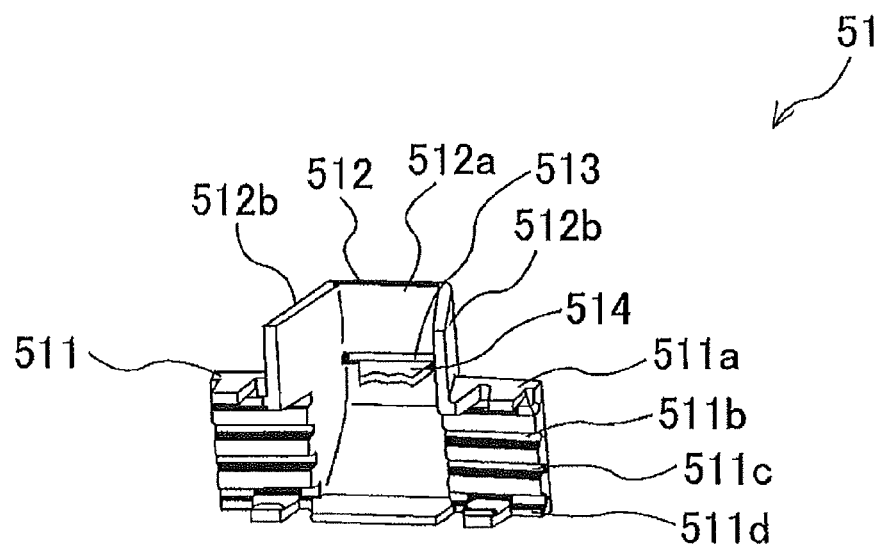
FIG. 13 is a partial perspective view illustrating an inner circumferential surface of an outer clip for configuring the bus ring.

As illustrated in FIG. 13, the outer clip 51, which is engaged with the inner clip 52, includes a ring shaped portions (a main body portion) 511. A second upper surface 511a, third and fourth ribs 511b and 511c and a second bottom surface 511d are formed at an inner circumferential surface of the ring shaped portion 511, and the outer clip 51 together with the inner clip 52 holds the first, second and third wire segments 53u, 53v and 53w.

Both end portions of each of the first, second and third wire segments 53u, 53v and 53w extend in the upper direction of the bus ring 5, and the electricity supply terminals 54 are swaged to the end portions of each of the first, second and third wire segments 53u, 53v and 53w so that the wire segments of the same phase are connected to each other. Each of the electricity supply terminals 54 includes a swaging portion 541, which is swaged to the end portions of each of the first, second and third wire segments 53u, 53v and 53w, and a coil engagement portion 542, which extends from the swaging portion 541 in the radially inner direction of the bus ring 5. An end portion of each of the coil engagement portions 542 extends in the upper direction of the bus ring 5 before being bent in the lower direction of the bus ring 5, thereby being formed into a substantially inverted U shape (see FIG. 12).

A plurality of holding flanges 522 protrudes from the first upper surface 521a of the inner clip 52 in the radially outer direction, and the holding flanges 522 are spaced away from each other by an equal length in the circumferential direction of the inner clip 52. Each of the holding flanges 522 includes a cut portion 522a, which is formed into a substantially trapezoid shape, and the end portions of the first, second and third wire segments 53u, 53v and 53w are inserted through the cut portion 522a. Each of the holding flanges 522 further includes a pair of holding protrusions 522b, with which each of the coil engagement portions 542 of the electricity supply terminal 54 is engaged so as to be held therebetween.

On the other hand, a plurality of surrounding portions (closing portions) 512 protrudes from the second upper surface 511a of the outer clip 51 in the upper direction of the bus ring 5 (see FIG. 13). The surrounding portions 512 are spaced away from each other by an equal length in the circumferential direction of the outer clip 52. The surrounding portion 512 is formed into a substantially wall shape, protruding in the radially outer direction of the bus ring 5, and includes a vertical wall portion 512a (a peripheral wall), formed at radially outer portion of the surrounding portion 512, and side walls 512b (peripheral walls), extending from both ends of the vertical wall portion 512a in the radially inner direction of the bus ring 5.

An end portion (an opening end) of each of the side walls 512b is open. Thus, the surrounding portion 512 is formed into a substantially C shape when seen in a planar view. When the outer clip 51 and the inner clip 52 are engaged with each other, the surrounding portion 512 surrounds the electricity supply terminal 54, which is swaged to each of the first, second and third wire segments 53u, 53v and 53w (see FIG. 11). The end portions of the first, second and third wire segments 53u, 53v and 53w are connected to each other so that the end portions of the wire segments of the same phase protrude within every third surrounding portions 512 in a circumference of the bus ring 5.

A terminal hole 513 is formed at three of the vertical wall portion 512a so as to extend therethrough. Each of the first, second and third external terminals 55u, 55v and 55w (described above) is arranged so as to extend through the terminal hole 513. Further, a supporting piece 514, which holds the swaging portion 541 of the electricity supply terminal 54, protrudes from an inner circumferential surface of each of the vertical wall portions 512a, at a lower position of the terminal holes 513 (see FIG. 13).

Figure 14:
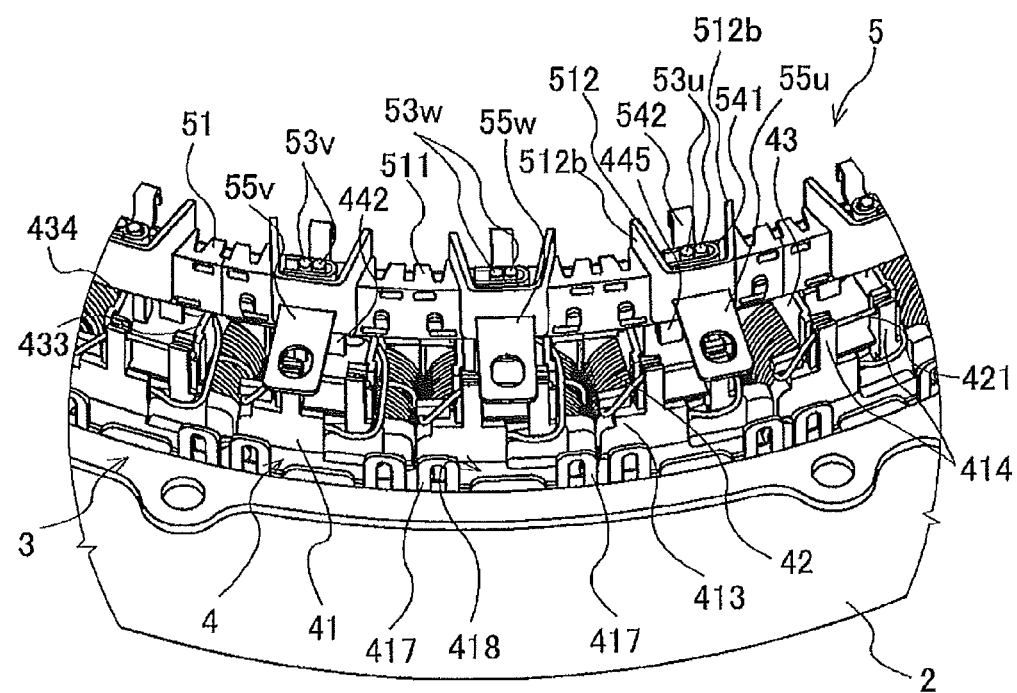
FIG. 14 is a diagram illustrating a state where the bus ring is being attached to a core unit.
Figure 15:
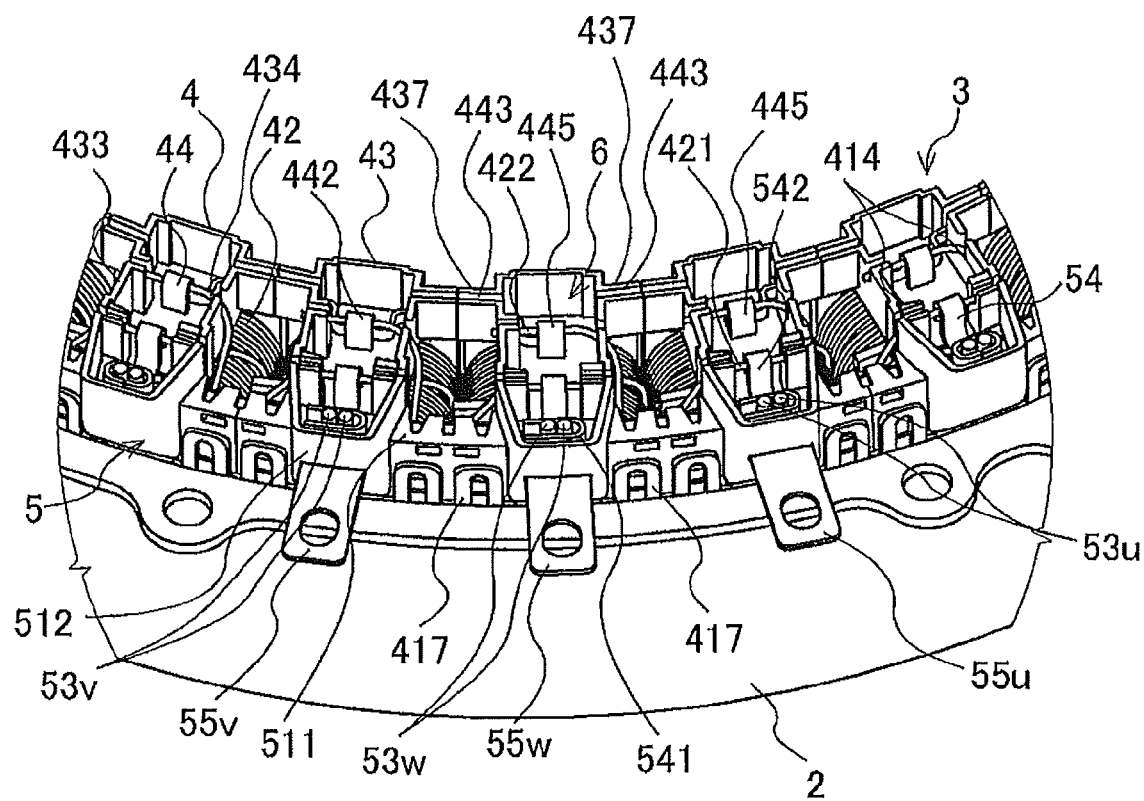
FIG. 15 is a diagram illustrating a state where the bus ring is attached to the core unit.

As illustrated in FIG. 14, in order to attach the bus ring 5 to the core unit 3, which is held by the stator housing 2, the bus ring 5 is positioned so as to face the core unit 3 from the upper direction of the bus ring 5. Then, the ring shaped portion 511 of the outer clip 51 is arranged within the bus ring insertion portion 418 of the split core 4. The surrounding portion 512 of the bus ring 5 is positioned so that an outer peripheral surface thereof is arranged between the pair of retainers 417 in the circumferential direction. Consequently, end portions of the side walls 512b of the surrounding portion 512 face opening end portions of the first and second side plates 433 and 434 of the resin box 43 via the wire engagement portions 414 of the split core 4 from the radially outer direction.

Accordingly, the accommodating portion 6 (see FIG. 16), configured by the wire engagement portions 414, the resin box 43 and the surrounding portion 512 so as to be formed into a substantially container shape having a predetermined volume, is individually formed at an upper side of the split core 4 relative to each of the split cores 4. The coil engagement portion 542 of the electricity supply terminal 54 is engaged with the high voltage side end portions 421 of the coil 42, extending between the wire engagement portions 414, within the accommodating portion 6, and then fixed thereto by means of the fusing, swaging and welding and the like.

The insulating resin material, serving as a potting material, is injected in the accommodating portion 6 in a state where a connecting portion of the high voltage side end portion 421 of the coil 42 and the electricity supply terminal 54 and a connecting portion of the low voltage side end portion 422 and the neutral point terminal 44 are accommodated within the accommodating portion 6. The insulating resin material includes a predetermined viscosity. Therefore, even when a clearance may be generated between the wire engagement portions 414 and the resin box 43 and between the wire engagement portions 414 and the surrounding portion 512 at the time of filling, the insulating resin material may not flow out of the accommodating portion 6. After the filled insulating resin material is solidified, the core holder 41, the resin box 43 and the bus ring 5 are fixed, and thereby completing the assembly of the stator 1. When electricity is applied in the stator 1 from the first, second and third external terminals 55u, 55v and 55w to the coils 42 of each phase through the first, second and third wire segments 53u, 53v and 53w, a rotating magnetic field is generated.

According to the embodiment, the insulating resin material is injected in the container-shaped accommodating portion 6, which is individually formed relative to each of the split cores 4, in a state where the connecting portion of the high voltage side end portion 421 of the coil 42 and the electricity supply terminal 54 and the connecting portion of the low voltage side end portion 422 and the neutral point terminal 44 are accommodated within the accommodating portion 6. Therefore, the insulating resin material may not flow out of the accommodating portion 6. Accordingly, an amount of insulating material for filling may be reduced, and as a result a cost of the stator 1 may be reduced.

Compared to a case where an entire circumference of the stator 1 is filled with the insulating resin material, an area to be filled with the insulating resin material is reduced. Therefore, a defect in filling of the insulating resin material may be less likely to occur, and the connecting portions may be more suitably insulated. Accordingly, the rotary electrical machine, having the stator, is more suitably operated. The accommodating portion 6 is formed in a manner where the resin box 43, which is provided to the split core 4 so as to be attachable thereto and detachable therefrom, is closed by the surrounding portion 512 of the bus ring 5. In order to wind the wire for forming the coil 42 at the time of manufacturing the split core 4, the resin box 43 may be removed from the split core 4 so as not to interfere with the winding of the coil 42. Accordingly, the stator 1 may be easily manufactured.

The accommodating portion 6 is filled with the insulating resin material in a state where the rear end portions of the holder engagement portions 435 of the resin box 43 are inserted into the corresponding engagement holes 412 of the core holder 14 and where the first and second stepped portions 433a and 434a of the first and second side plates 433 and 434 are engaged with the corresponding wire engagement portions 414 from the outer circumferential direction. Therefore, displacement of the resin box 43 relative to the core holder 41 at the time of filling of the insulating resin material may less likely to occur.

The bus ring 5 is attached to the core unit 3 so that the opening end portions of the surrounding portion 512 respectively face the opening end portions of the resin boxes 43 from the radially outer direction and so that the outer peripheral surface of the surrounding portion 512 is positioned between the pair of retainers 417. In such a state, the insulating resin material is injected. Accordingly, the surrounding portion 512 of the bus ring 5 serves as a portion of the accommodating portion 6 and the surrounding portion 512 of the bus ring 5 is used in order to determine the position of the bus ring 5 relative to the core unit 3.

The neutral point terminal 44 and the electricity supply terminal 54 are respectively connected to the low voltage side end portion 422 and the high voltage side end portion 421 of the coil 42, each of which extend through the accommodating portion 6. Therefore, each of the neutral point terminal 44 and the electricity supply terminal 54 is easily swaged, fused, and the like to the coil 42.

[Other embodiments]

The above-described embodiment may be modified as follows. The stator 1 may be adaptable to a synchronous motor, an induction motor, a direct current motor, and another rotary electrical machine.

The bus ring 5, which holds the first, second and third wire segments 53u, 53v and 53w for supplying the electricity, may be arranged the bus ring 5 is positioned at an inner portion of the core unit 3 in the radial direction of the stator 1. Alternatively, the bus ring 5 may be positioned so that the bus ring 5 and the core unit 3 are aligned in the axial direction of the stator 1. Further, the insulating resin material may be filled in a state where only one of the connecting portion of the high voltage side end portion 421 of the coil 42 and the electricity supply terminal 54 and the connecting portion of the low voltage side end portion 422 of the coil 42 and the neutral point terminal 44 is accommodated within the accommodating portion 6.

A plurality of accommodating portions 6 may be formed relative to each of the split cores 4 so that the accommodating portions 6 is filled with the insulating resin material in a state where the connecting portion of the high voltage side end portion 421 of the coil 42 and the electricity supply terminal 54 and the connecting portion of the low voltage side end portion 422 of the coil 42 and the neutral point terminal 44 are separately accommodated within the different accommodating portions 6.

Slits may be formed at the peripheral walls 432, 512a and 512b, and the low voltage side end portion 422 or the high voltage side end portion 421 of the coil 42 may be arranged so as to extend between the peripheral walls, which are opposed to each other.

According to the embodiment, the stator 1 of the rotary electrical machine for generating a rotating magnetic field when the coils 42 are energized through the electricity supply wires 53u, 53v and 53w, the stator 1 of the rotary electrical machine includes the core unit 3 configured by a plurality of split cores 4, around which the wires are respectively wound to form the coils 42 and which are arranged to form a ring shape, including the low voltage side terminals 44, which connect the high voltage side end portions 422 of the coils 42, and including the bus ring 5 formed into a ring shape so as to face the core unit 3, holding the electricity supply wires 53u, 53v and 53w, and attached to the core unit 3 so as to connect the low voltage side end portions 421 of the coils 42 to the electricity supply wires 53u, 53v and 53w by means of high voltage side terminals 54. The plurality of split cores 4 is engaged with the bus ring 5, and each of the accommodating portions 6, which is formed into a container shape having a predetermined volume, is individually formed relative to each of the plurality of split cores 4 at an external side of the coils 42 in a state where the bus ring 5 is attached to the core unit 3. Each of the terminal accommodating portions 6 is filled with an insulating resin material in a state where at least one of a connecting portion of the high voltage side end portion 422 of each of the coils 42 and each of the low voltage side terminals 44 and a connecting portion of the low voltage side end portion 421 of each of the coils 42 and each of the high voltage side terminals 54 is accommodated within each of the accommodating portions 6.

Accordingly, the insulating resin material is injected in the container-shaped terminal accommodating portion 6, which is individually formed relative to each of the split cores 4, in a state where at least one of the connecting portion of the low voltage side end portion 422 the coil 42 and the neutral point terminal 44 and the connecting portion of the high voltage side end portion 421 of the coil 42 and the electricity supply terminal 54 are accommodated within the terminal accommodating portion 6. Therefore, the insulating resin material may not flow out of the terminal accommodating portion 6. Accordingly, an amount of insulating material for filling may be reduced, and a cost of the stator 1 may be reduced. Further, an area to be filled with the insulating resin material is reduced. Accordingly, the rotary electrical machine, having the stator, is more suitably operated.

According to the embodiment, a plurality of resin boxes 43, each of which is formed into a container shape and opens toward the bus ring 5, are respectively provided to the plurality of split cores 4 so as to be attachable thereto and detachable therefrom. A plurality of surrounding portions 512, each of which closes an opening of each of the plurality of resin boxes 43, is formed at the bus ring 5 at a circumference thereof. The plurality of resin boxes 43 respectively faces the plurality of surrounding portions 512, and thereby forming the accommodating portions 6 when the bus ring 5 is attached to the core unit 3.

Accordingly, the terminal accommodating portion 6 is formed in a manner where the resin box 43, which is provided to the split core 4 so as to be attachable thereto and detachable therefrom, is closed by the surrounding portion 512 of the bus ring 5. In order to wind the coil 42 around the split core 4, the resin box 43 may be removed from the split core 4 so as not to interfere with the winding of the coil 42. Accordingly, the stator 1 may be easily manufactured.

According to the embodiment, the first flange portion 411 and the wire engagement portion 414 are formed at each of the plurality of split cores 4 so as to extend in the axial direction of the core unit 3. Each of the accommodating portions 6 is filled with the insulating resin material in a state where an outer peripheral portion of each of the plurality of resin boxes 43 is engaged with each of first flange portion 411 and the wire engagement portion 414.

Accordingly, the terminal accommodating 6 is filled with the insulating resin material in a state where the outer peripheral portion of the resin box 43 is engaged with the first flange 411 and the wire engagement portions 414 of the split core 4. Therefore, displacement of the resin box 43 relative to the split core 4 at the time of filling of the insulating resin material may be restricted.

According to the embodiment, the main body portion 511, which is formed into a ring shape and holding the electricity supply wire 53u, 53v and 53w at the inner side thereof, is formed at the bus ring 5. Each of the plurality of surrounding portions 512 is formed at an end surface of the main body portion 511 in the direction of the rotational axis, includes the pair of opening ends opening in the radially inner direction of the bus ring 5, a portion between the pair of opening ends protruding in the radially outer direction of the bus ring 5, and thereby each of the plurality of surrounding portions 512 is formed into a wall shape. The pair of retainers 417, which extends in the axial direction of the core unit 3 and faces each of the plurality of resin boxes 43 in the radial direction of the plurality of split cores 4, is formed at the radially outer end surface of each of the plurality of split cores 4. Each of the plurality of accommodating portions 6 is filled with the insulating resin material in a state where the pair of opening ends of each of the plurality of surrounding portions 512 faces the opening of each of the plurality of resin boxes 43 from the radially outer direction of the bus ring 5 and in a state where an outer peripheral surface of each of the plurality of surrounding portions 512 is positioned between the pair of retainers 417, when the bus ring 5 is attached to the core unit 3.

Accordingly, the bus ring 5 is attached to the core unit 3 so that the opening end portion of the surrounding portion 512 faces the opening end portion of the resin box 43 from the radially outer direction and so that the outer peripheral surface of the surrounding portion 512 is positioned between the pair of retainers 417. In such a state, the insulating resin material is injected. Accordingly, the surrounding portion of the bus ring 5 serves as a portion of the terminal accommodating portion 6 and the surrounding portion 512 of the bus ring 5 is used in order to determine the position of the bus ring 5 relative to the core unit 3.

According to the embodiment, the slits 415, 433b and 436a are respectively formed at at least a pair of peripheral walls 414, 432, 433, 434, 512a and 512b provided at each of the plurality of accommodating portions 6 so as to face each other. At least the high voltage side end portion 422 and the low voltage side end portion 421 of each of the coils 42 is inserted into the slits 415, 433b and 436a so as to extend between the peripheral walls 414, 432, 433, 434, 512a and 512b. Each of the low voltage side terminals 44 or each of the high voltage side terminals 54 is connected to a portion of the high voltage side end portion 422 of each of the coils 42 or a portion of the low voltage side end portion 421 of each of the coils 42 extending between the peripheral walls 414, 432, 433, 434, 512a and 512b.

Accordingly, the neutral point terminal 44 and the electricity supply terminal 54 are respectively connected to the low voltage side end portion 422 and the high voltage side end portion 421 of the coil 42, which extends through the accommodating portion 6. Therefore, the neutral point terminal 44 and the electricity supply terminal 54 are easily swaged, fused, and the like to the coil 42.

According to the embodiment, the bus ring 5 is at least partially positioned at the outer portion of the core unit 3 in the radial direction of the stator 1.

Accordingly, a stator of a rotary electrical machine, in which an end portion of a coil is sufficiently insulated and a cost for manufacturing the same is reduced, is provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A stator of a rotary electrical machine for generating a rotating magnetic field when coils are energized through electricity supply wires, the stator of the rotary electrical machine, comprising:
   a core unit configured by a plurality of core assemblies, around which wires are respectively wound to form the coils and which are arranged to form a ring shape, including low voltage side terminals, which connect first ends of the coils; and
   a bus ring formed into a ring shape so as to face the core unit, holding the electricity supply wires, and attached to the core unit so as to connect second ends of the coils to the electricity supply wires by means of high voltage side terminals; wherein
   the plurality of core assemblies is engaged with the bus ring, and each terminal accommodating portion, which is formed into a container shape having a predetermined volume, is individually formed relative to each of the plurality of core assemblies at an external side of the coils in a state where the bus ring is attached to the core unit;
   a plurality of connecting portions including first connecting portions each connecting the first end of one of the coils to one of the low voltage side terminals and second connecting portions each connecting the second end of one of the coils to one of the high voltage side terminals;
   each of the terminal accommodating portions being filled with insulating resin material;
   at least one of the connecting portions being accommodated within each of the terminal accommodating portions;
   a plurality of box portions, each of which is formed into a container shape and opens toward the bus ring, are respectively provided to the plurality of core assemblies so as to be attachable thereto and detachable therefrom;
   a plurality of closing portions, each of which closes an opening of each of the plurality of box portions, is formed at the bus ring at a circumference thereof;
   a main body portion, into a ring shape and holding the electricity supply wire at an inner side thereof, is formed at the bus ring;
   each of the plurality of closing portions is formed at an end surface of the main body portion in a direction of a rotational axis, includes a pair of opening ends opening in a radially inner direction of the bus ring, a portion between the pair of opening ends protruding in a radially outer direction of the bus ring, and thereby each of the plurality of closing portions is formed into a wall shape;
   a pair of holding portions, which extends in the axial direction of the core unit and faces each of the plurality of box portions in a radial direction of the plurality of core assemblies, is formed at a radially outer end surface of each of the plurality of core assemblies; and
   wherein each of the plurality of terminal accommodating portions is filled with the insulating resin material in a state where the pair of opening ends of each of the plurality of closing portions faces the opening of each of the plurality of box portions from the radially outer direction of the bus ring and in a state where an outer peripheral surface of each of the plurality of closing portions is positioned between the pair of holding portions, when the bus ring is attached to the core unit.

2. The stator of the rotary electrical machine according to claim 1, wherein
   the plurality of box portions respectively faces the plurality of closing portions, and thereby forming the terminal accommodating portions when the bus ring is attached to the core unit.

3. The stator of the rotary electrical machine according to claim 2, wherein
   protruding portions are formed at each of the plurality of core assemblies so as to extend in an axial direction of the core unit, and wherein
   each of the terminal accommodating portions is filled with the insulating resin material in a state where an outer peripheral portion of each of the plurality of box portions is engaged with each of the protruding portions.

4. The stator of the rotary electrical machine according to claim 1, wherein
   slits are respectively formed at at least a pair of peripheral walls provided at each of the plurality of terminal accommodating portions so as to face each other,
   at least the first end and the second end of each of the coils is inserted into the slits so as to extend between the peripheral walls, and wherein
   each of the low voltage side terminals or each of the high voltage side terminals is connected to a portion of the first end of each of the coils or a portion of the second end of each of the coils extending between the peripheral walls.

5. The stator of the rotary electrical machine according to claim 2, wherein
slits are respectively formed at at least a pair of peripheral walls provided at each of the plurality of terminal accommodating portions so as to face each other,
at least the first end and the second end of each of the coils is inserted into the slits so as to extend between the peripheral walls, and wherein
each of the low voltage side terminals or each of the high voltage side terminals is connected to a portion of the first end of each of the coils or a portion of the second end of each of the coils extending between the peripheral walls.

6. The stator of the rotary electrical machine according to claim 3, wherein
slits are respectively formed at at least a pair of peripheral walls provided at each of the plurality of terminal accommodating portions so as to face each other,
at least the first end and the second end of each of the coils is inserted into the slits so as to extend between the peripheral walls, and wherein
each of the low voltage side terminals or each of the high voltage side terminals is connected to a portion of the first end of each of the coils or a portion of the second end of each of the coils extending between the peripheral walls.

7. The stator of the rotary electrical machine according to claim 1, wherein
the bus ring is at least partially positioned at an outer portion of the core unit in the radial direction of the stator.

8. The stator of the rotary electrical machine according to claim 1, wherein each of the terminal accommodating portions accommodates one of the first connecting portions and one of the second connecting portions.

* * * * *